United States Patent [19]
Takahasahi

[11] Patent Number: 6,014,369
[45] Date of Patent: Jan. 11, 2000

[54] METHOD AND APPARATUS FOR TESTING SUBSCRIBERS ACCOMMODATED TO SERVICE NODE IN LOOP SYSTEM

[75] Inventor: Shigeki Takahasahi, Kawasaki, Japan

[73] Assignee: Fujitsu Limited, Kanagawa, Japan

[21] Appl. No.: 07/885,708

[22] Filed: May 19, 1992

[30] Foreign Application Priority Data

May 20, 1991 [JP] Japan ................................ 3-114573

[51] Int. Cl.[7] .................................................. H04Q 1/20
[52] U.S. Cl. .................... 370/248; 370/249; 370/522; 370/535; 379/24
[58] Field of Search .............................. 370/13, 16, 16.1, 370/94.1, 95.3, 85.1, 58.1, 15, 242, 248, 249, 522, 535, 539; 371/8.1–2, 11.2, 20.2; 375/5; 379/5, 6, 24, 29, 30, 102.01

[56] References Cited

U.S. PATENT DOCUMENTS

| | | | |
|---|---|---|---|
| 3,912,882 | 10/1975 | Beerbaum | 379/5 |
| 4,419,751 | 12/1983 | Cholat-Namy et al. | 370/13 |
| 4,611,101 | 9/1986 | Walter et al. | 379/24 |
| 4,663,775 | 5/1987 | Olek | 379/24 |
| 4,719,624 | 1/1988 | Bellisio | 370/110.1 |
| 4,730,313 | 3/1988 | Stephenson et al. | 370/110.1 |
| 4,935,921 | 6/1990 | Ishizaki et al. | 370/58.1 |
| 5,005,170 | 4/1991 | Nelson | 370/58.1 |
| 5,027,343 | 6/1991 | Chan et al. | 370/17 |
| 5,138,608 | 8/1992 | Kucera et al. | 370/13 |
| 5,195,124 | 3/1993 | Ishioka | 379/29 |
| 5,222,119 | 6/1993 | Asano | 379/24 |

FOREIGN PATENT DOCUMENTS

| | | |
|---|---|---|
| 1-112844 | 5/1989 | Japan . |
| 1-212138 | 8/1989 | Japan . |

*Primary Examiner*—Chau Nguyen
*Attorney, Agent, or Firm*—Nikaido Marmelstein Murray & Oram LLP

[57] ABSTRACT

An FTTH (Fiber to the HOME) or FITL (Fiber in the Loop) system comprises a FSN (Fiber Service Node) accommodating various types of subscribers and a RT (Remote Terminal) connected through an optical fiber cable to the FSN and connected through a multiplex transmission line to a central office exchange. A test unit for performing a test of the subscriber is provided within the FSN. A test start message is issued through the central office exchange to the test unit of the FSN and the test results are received through the central office exchange from the test unit of the FSN. Communication between the RT and the FSN is carried out using overhead bits of multi-frames and according to a bit-oriented process. A test command transmitted from the RT to FSN does not include subscriber types and the test unit obtains that information from subscriber circuits. Therefore, the FSN becomes compact and costs are low.

14 Claims, 9 Drawing Sheets

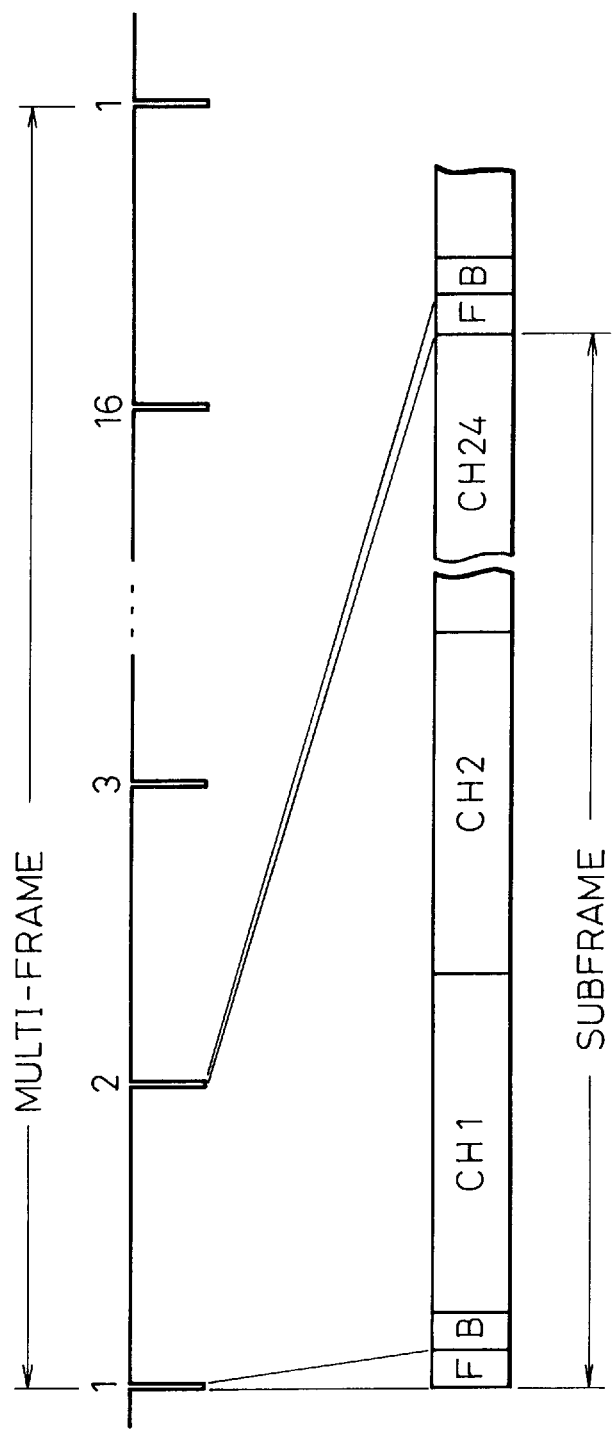

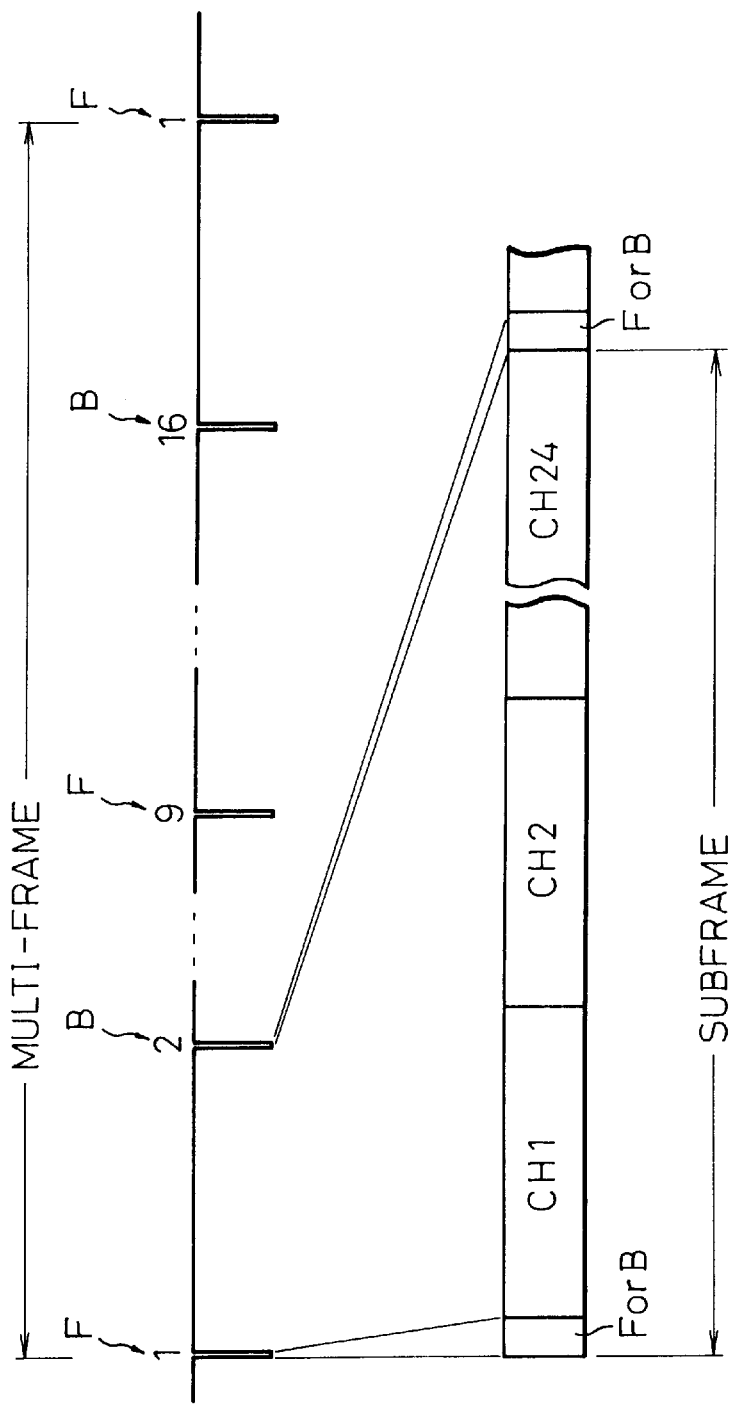

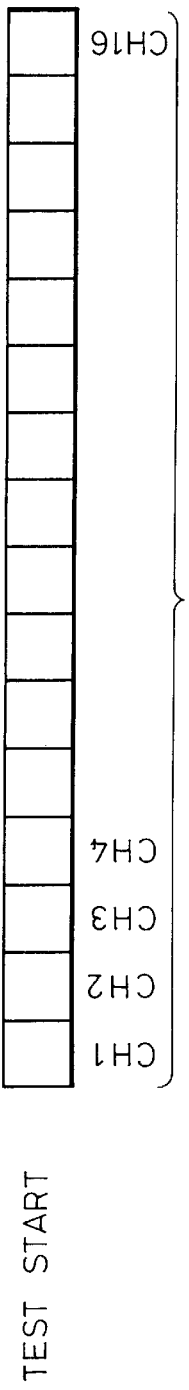
Fig.8A TEST START
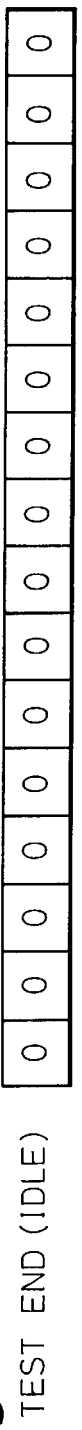
Fig.8B TEST END (IDLE)
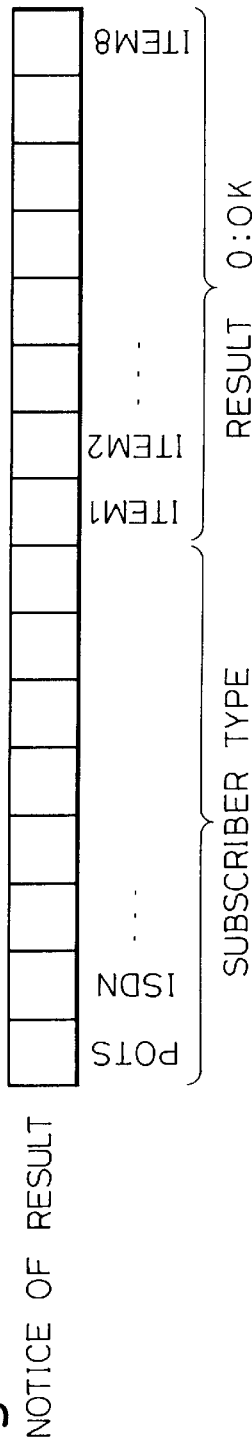
Fig.8C NOTICE OF RESULT
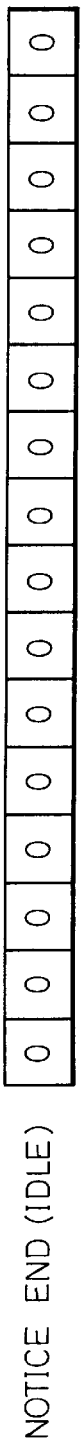
Fig.8D NOTICE END (IDLE)

METHOD AND APPARATUS FOR TESTING SUBSCRIBERS ACCOMMODATED TO SERVICE NODE IN LOOP SYSTEM

BACKGROUND OF THE INVENTION

1. Field of the Invention

The present invention relates to a method and an apparatus for testing subscribers accommodated to an FSN (Fiber Service Node) that is connected through an optical fiber cable to an RT (Remote Terminal) connected through a multiplex transmission line to a central office exchange, to thereby construct an FTTH (Fiber To The Home) or FITL (Fiber In The Loop) system.

2. Description of the Related Art

DLC (Digital Loop Carrier) systems are introduced mainly to accommodate many subscribers lying scattered over a vast region. In such DLC systems, an RT located remotely from a central office exchange accommodates a few hundreds of subscribers through metallic cables, and the RT is connected through a multiplex transmission line to the central office exchange. An optical fiber cable is usually used for providing the multiplex transmission line.

In the FTTH or FITL system, the FSN is installed within or near houses of the subscribers in order to use the optical fiber cable having applicability to future broad band communication and economical merits over the future term instead of the metallic cable between the RT and the subscribers. Use of the optical fiber cable between the RT and the subscriber enables a broad band transmission such as video signal transmission. Since the FSN is installed within or near the houses of the subscribers, the FSN is designed to have a capacity of accommodating dozens of subscribers.

So far as the usual DLC systems are concerned, there have been provided two conventional methods of testing subscribers from an operating system connected to the central office exchange. One method is to lay a metallic cable between the operating system and the RT in order to directly test the subscribers from the operating system through the metallic cable. Another method is to locate a test device at the RT and reserve one of the transmission channels of the multiplex transmission line between the central office exchange and the RT for communicating with the testing device. The testing device receives a message including a test command and an identifier of the tested subscriber through the reserved channel from the operating system and notifies the operating system of the results through the reserved channel.

Supposing that the former or the latter method is applied to the FTTH or FITL system, a metallic cable or a reserved transmission channel must be also provided between the RT and the FSN. Since the FSN accommodates relatively fewer subscribers than that of the RT, it requires a greater expenditure to provide a metallic cable or a reserved channel within the optical fiber cable between the RT and the FSN than between the central office exchange and the RT.

SUMMARY OF THE INVENTION

It is an object of the present invention to provide a method and an apparatus for testing a subscriber accommodated to an FSN at a low cost.

In accordance with the present invention, there is provided a method of testing subscribers accommodated to a service node connected through a first bidirectional multiplex transmission line providing bidirectional communication channels for each of the subscribers to a remote terminal connected through a second bidirectional multiplex transmission line to a central office exchange, comprising the steps of, sending a first order to test a subscriber accommodated to the service node through the central office exchange and the second bidirectional multiplex transmission line to the remote terminal;

sending a second order from the remote terminal through the first bidirectional multiplex transmission line to the service node in response to the first order;

testing the subscriber in the service node in response to the second order;

sending a first notice including results of the test from the service node through the first bidirectional multiplex transmission line to the remote terminal, and sending a second notice from the remote terminal through the second bidirectional multiplex transmission line and the central office exchange in response to the first notice.

In accordance with the present invention, there is also provided a remote terminal for connection to a service node accommodating subscribers through a first bidirectional multiplex transmission line providing bidirectional communication channels for each of the subscribers, and for connection through a second bidirectional multiplex transmission line to a central office exchange; the remote terminal being adapted to test of the subscribers, comprising a first multiplexer/demultiplexer means for separating a first order to test a subscriber accommodated to the service node from the second bidirectional transmission line, and for incorporating a first notice into the second bidirectional transmission line;

means for converting the first order into a second order, and for converting a second notice including the results of a test into the first notice; and a second multiplexer/demultiplexer means for incorporating the second order into the first bidirectional multiplex transmission line, and for separating the second notice from the first bidirectional multiplex transmission line.

In accordance with the present invention, there is also provided a service node for accommodating subscribers, and for connection through a first bidirectional multiplex transmission line providing bidirectional communication channels for each of the subscribers to a remote terminal connected through a second bidirectional transmission line to a central office exchange; the service node being adapted to a test of the subscribers, comprising a multiplexer/demultiplexer means for separating an order to test a subscriber accommodated to the service node from the first bidirectional multiplex transmission line, and for incorporating a notice including the results of a test into the first bidirectional multiplex transmission line, and a test means for testing the subscriber according to the order, and for generating the notice.

BRIEF DESCRIPTION OF THE DRAWINGS

FIGS. 6A and 6B are diagrams showing a construction of an example of a multi-frame according to the present invention;

FIGS. 7A and 7B are diagrams showing a construction of another example of a multi-frame according to the present invention;

FIGS. 8A to 8D are diagrams showing an example of bit-oriented commands according to the present invention.

DESCRIPTION OF THE PREFERRED EMBODIMENTS

Figure 1:
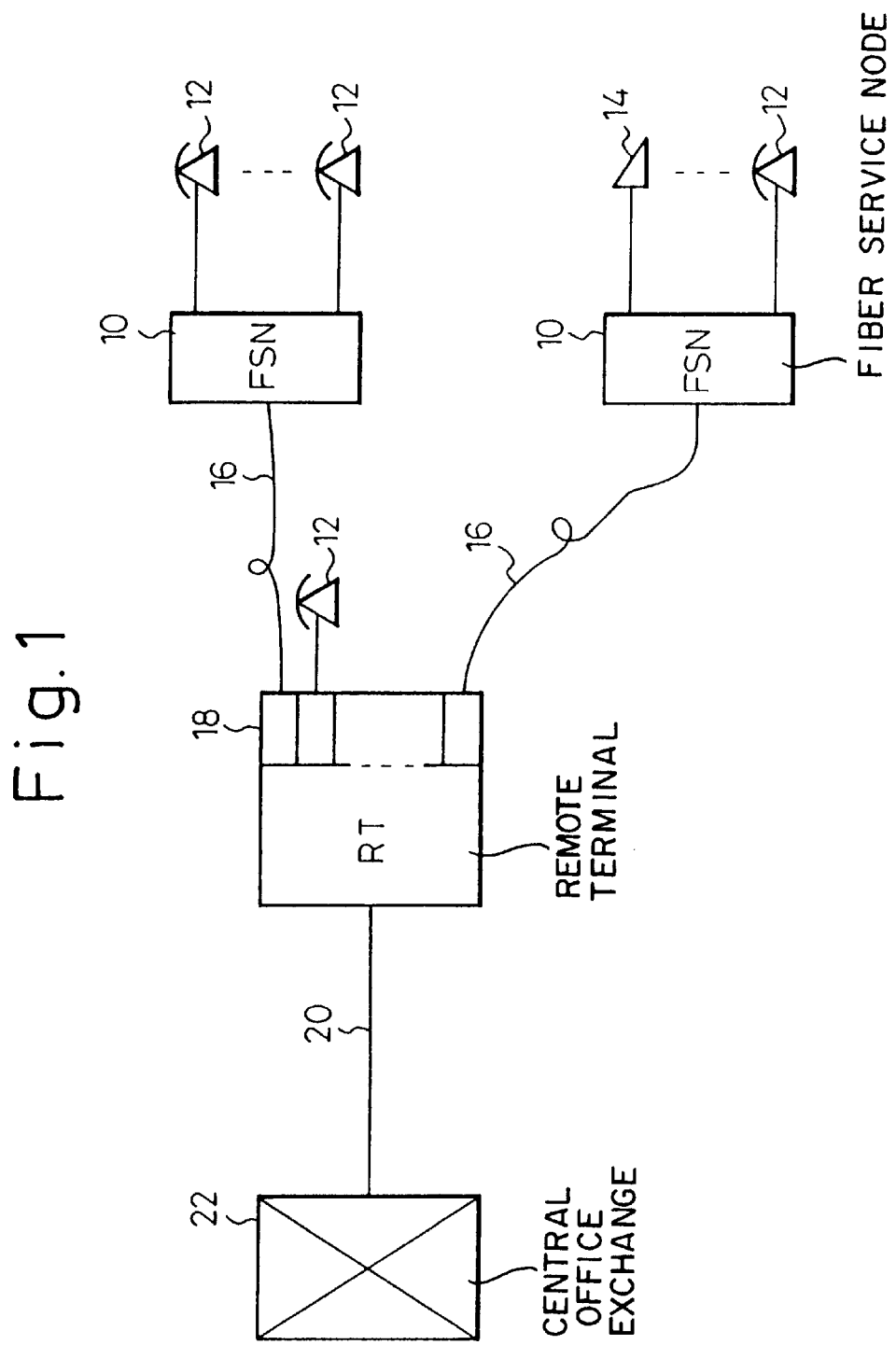
FIG. 1 is a block diagram showing an FTTH or FITL system.

FIG. 1 is a block diagram showing an FTTH (Fiber To The Home) or FITL (Fiber In The Loop) system.

FSN (Fiber Service Node) 10 accommodates various types of subscriber sets such as telephone sets 12 for a POTS (Plain Old Telephone Service), a terminal 14 for an ISDN (Integrated Services Digital Network), and the like. The subscriber sets are connected to the FSN 10 through metallic cables or optical fiber cables. The subscriber sets may be terminals for broad band transmission such as a transmission of a video signal.

The FSN 10 is connected through an optical fiber cable 16 to an RT (Remote Terminal) 18. The optical fiber cable 16 provides a bidirectional multiplex transmission line accommodating a plurality of channels for a plurality of the subscriber sets accommodated to the FSN 10. The RT 18 is capable of accommodating a plurality of FSN's 10 or subscriber sets 12. The RT 18 is connected through a bidirectional multiplex transmission line 20 to a central office exchange 22.

Figure 2:
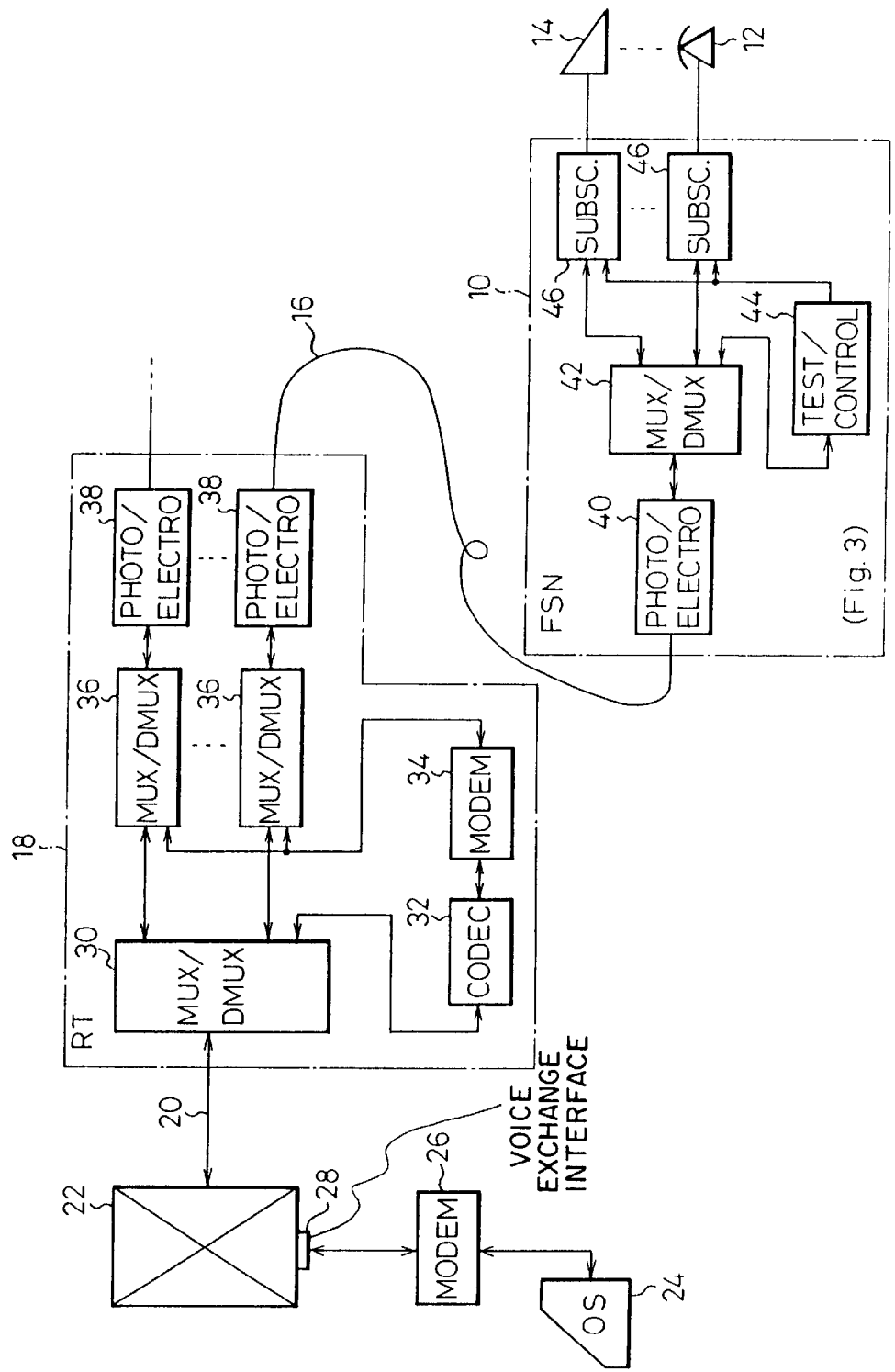
FIG. 2 is a block diagram showing a construction of the FTTH or FITL system equipped with means for testing subscribers according to a first embodiment of the present invention.

FIG. 2 is a block diagram showing a construction of the FTTH or FITL system equipped with means for testing subscribers accommodated to the FSN 10 according to a first embodiment of the present invention.

An operating system 24 is connected through a MODEM 26 to a voice-frequency interface 28 of the central office exchange 22.

The RT 18 comprises a multiplexer/demultiplexer 30 for decomposing the bidirectional multiplex transmission line 20 into individual channels. One of the channels is reserved for testing subscribers. The reserved bidirectional digital channel is converted into a voice-frequency channel by a CODEC 32 and is further converted into a baseband channel by a MODEM 34. In a multiplexer/demultiplexer 36, a bidirectional multiplex transmission line is constructed from the baseband channel and channels to be accommodated to the FSN 10. In a photoelectric converter 38, the bidirectional multiplex transmission line constructed in the multiplexer/demultiplexer 36 is converted into an optical transmission line to be adapted to the optical fiber cable 16.

The FSN 10 comprises a photoelectric converter 40 and a multiplexer/demultiplexer 42 for decomposing the bidirectional multiplex transmission line of the optical fiber cable 16 into individual channels. The baseband channel reserved for testing subscribers is terminated by a test/control section 44; Subscriber circuits 46 are provided in the other channels.

A message issued from the operating system 24 is transmitted along the reserved channel to the test/control section 44, and the message issued from the test/control section 44 is transmitted along the reserved channel in a reverse direction to the operating system 24.

Figure 3:
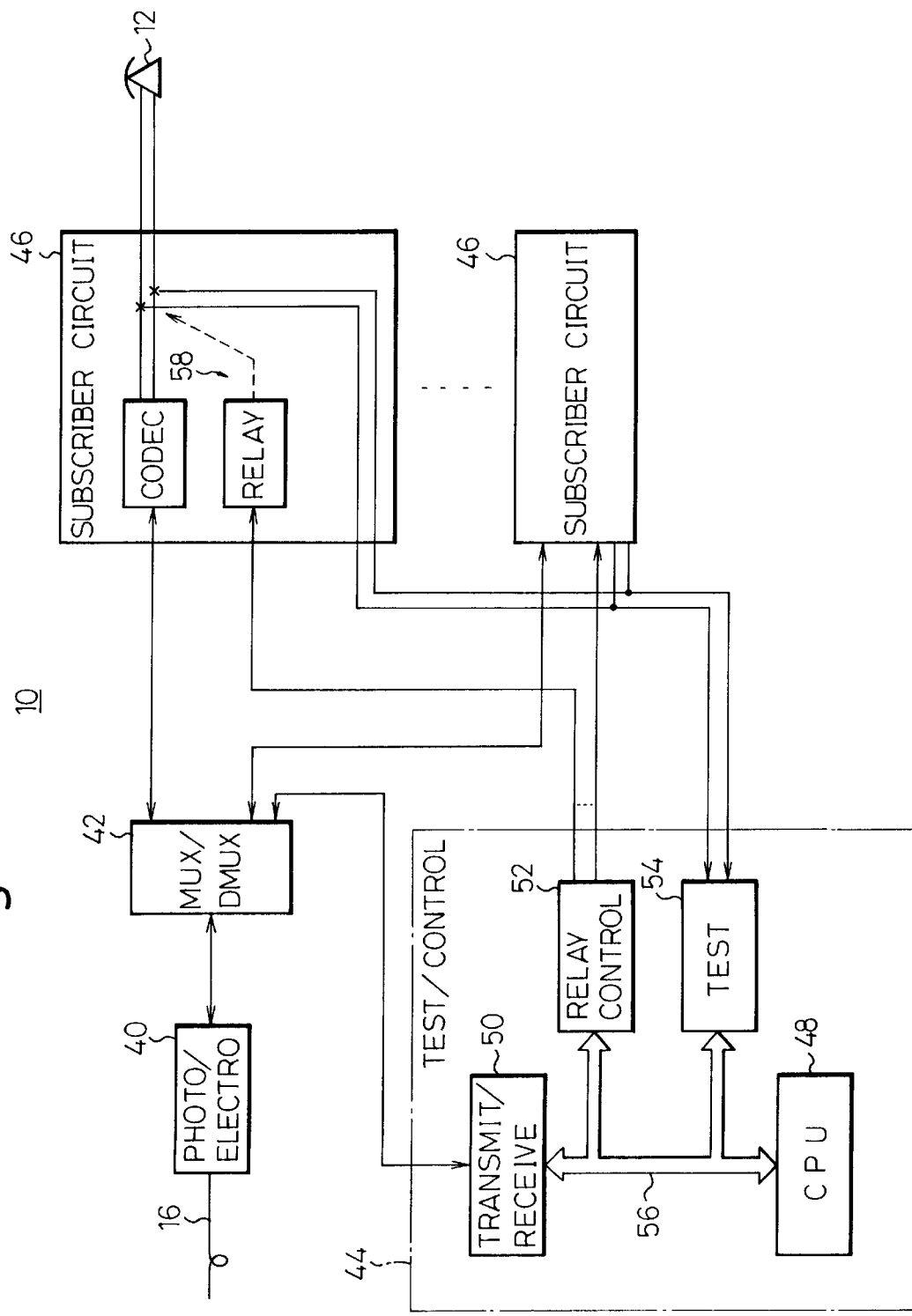
FIG. 3 is a block diagram showing a more detailed construction df the FSN 10 of FIG. 2.

FIG. 3 shows a more detailed construction of the FSN 10. The test/control section 44 comprises a CPU 48, a transmitter/receiver unit 50, relay control unit 52, and a test unit 54 connected to each other through a bus 56.

If the transmitter/receiver unit 50 receives a test start message including an identifier of a tested subscriber and a type thereof from the operating system 24, the CPU 48 interprets the message and controls a relay 58 comprised in the corresponding subscriber circuit 46 through the relay control unit 52 to connect the tested subscriber set 12 or 14 to the test unit 54. The test unit 54 tests the subscriber with regard to test items determined according to the type of the subscriber. If the subscriber is for a POTS (Plain Old Telephone Service), the test items are as follows:

foreign electro motive force;

three-terminal DC resistance and voltage; and three-terminal AC resistance, voltage and capacitance.

If the subscriber is for ISDN (Intergrated Services Digital Network), the test items are as follows:

foreign electro motive force;

two-terminal DC resistance and voltage;

two-terminal AC resistance, voltage and capacitance;

impulse noise;

background noise; and

2B1Q signal level.

A message including test results of the above test items is transmitted through the reserved channel to the operation system 24.

In the above embodiment, the channel reserved for testing subscribers occupies fewer bits than the other channels in the optical fiber cable 16, because the messages for testing subscribers are transmitted not in a pulse code signal but in a baseband signal. Therefore, the message can be transmitted on overhead bits of the multiplex transmission line. However, the communication between the operating system 24 and the test/control section 44 of the FSN 10 is carried out according to a message-oriented communication, i.e., communication by messages consisting of sequences of character codes. Therefore, a relatively large amount of data must be transmitted in the optical fiber cable 16. In addition, since the test/control section 44 must interpret the sequences of character codes, the construction thereof becomes complex and large.

Figure 4:
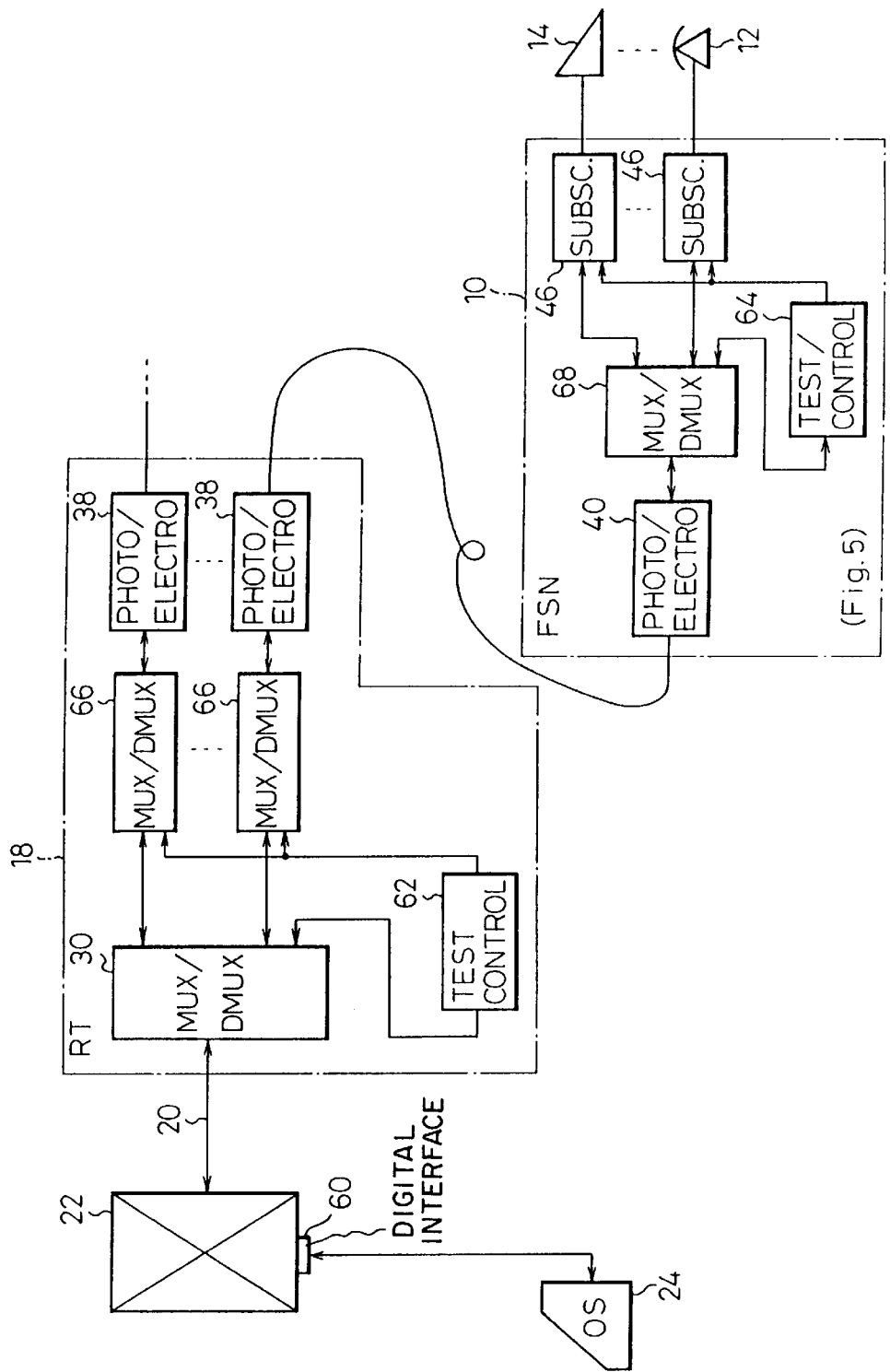
FIG. 4 is a block diagram showing another construction of the FTTH or FITL system equipped with means for testing subscribers according to a second embodiment of the present invention.

FIG. 4 shows a second embodiment of the present invention. In FIG. 4, the operating system 24 is connected through a digital interface 60 of the central office exchange 22. A test control unit 62 having a CPU is provided within the RT 18. The test control unit 62 receives a test start message through a reserved digital channel from the operating system 24 according to the message-oriented communication, and sends a test start command according to a bit-oriented process (described with reference to FIGS. 8A to 8D later) toward a test/control section 64 of the FSN 10 accommodating a subscriber to be tested.

The multiplexer/demultiplexer 66 inserts the commands sent from the test control unit 62 into a multi-frame as a part of overhead bits (described with reference to FIGS. 6A, 6B and 7A, 7B later). Although the message from the operating system 24 may contain information about the subscriber type, the command sent from the test control unit 62 does not include information about the subscriber type thereby simplifying the command. Instead, the test/control section 64 of the FSN 10 obtains information from each of the subscriber circuits 46.

Figure 5:
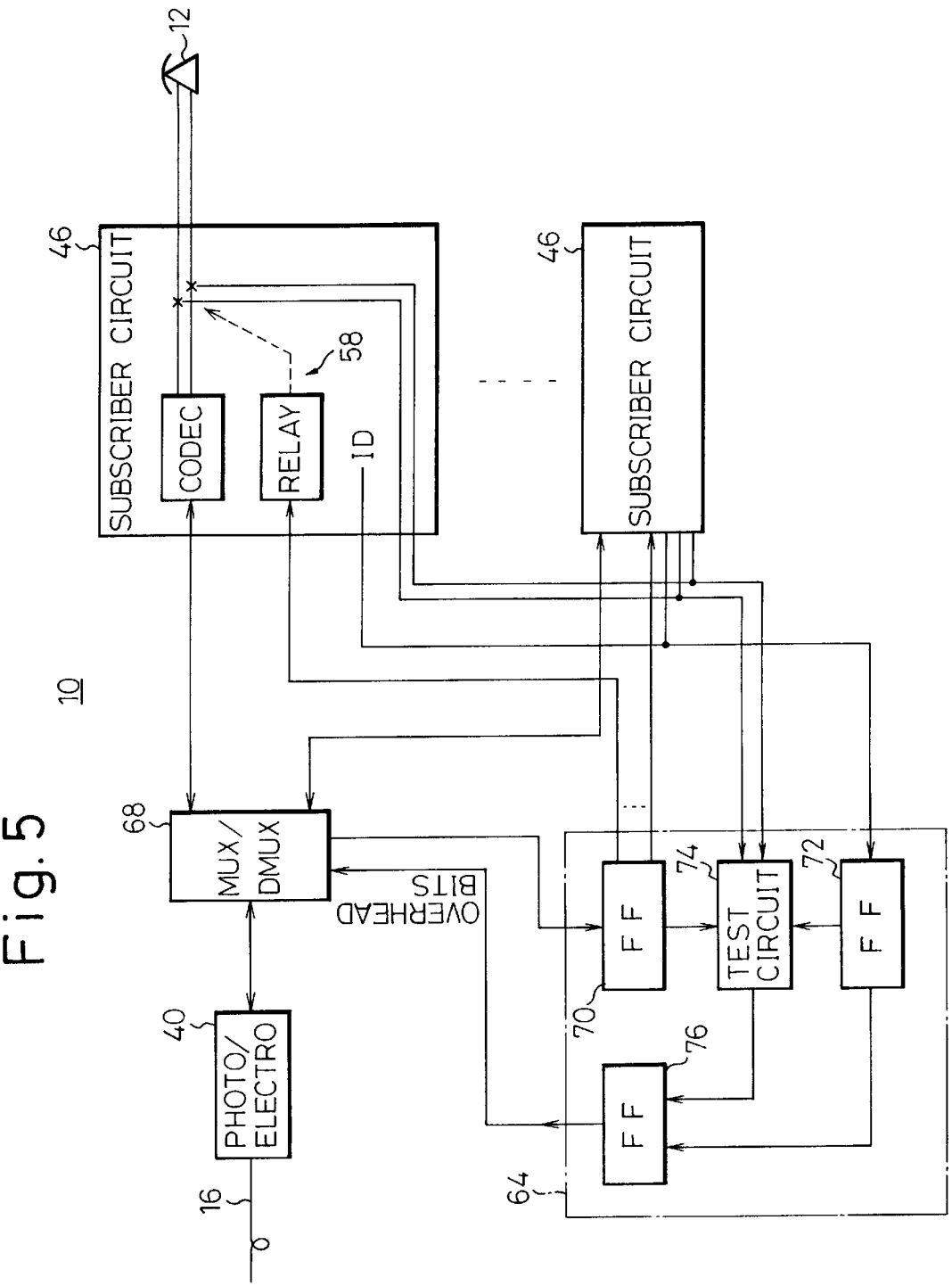
FIG. 5 is a block diagram showing a more detailed construction of the FSN 10 of FIG. 4.

FIG. 5 is a block diagram showing a more detailed construction of the FSN 10 of FIG. 4. A multiplexer/demultiplexer 68 drops or inserts the overhead bits. The command included in the overhead bits and dropped in the multiplexer/demultiplexer 68 are stored in a flip-flop 70 in parallel formation. If the command stored in the flip-flop 70 is a test start command, the data stored in the flip-flop 70 are immediately used for controlling the relay 58 of the subscriber circuit 46 to thereby connect a subscriber to be tested to a test circuit 74. The subscriber circuit 46 designated by that command outputs an identifier specifying the type of subscriber. The identifier output from the designated subscriber circuit 46 is stored in a flip-flop 72. In response to the test start command, the test circuit 74 tests the connected subscriber with regard to the test items determined according to the identifier stored in the flip-flop 72. After test has been completed, the test circuit 74 outputs the results of the test. The results output from the test circuit 74 and the identifier stored in the flip-flop 72 are stored in a flip-flop 76 and are inserted into a multi-frame as a part of the overhead bits in the multiplexer/demultiplexer 68.

FIGS. 6A and 6B show a construction of an example of the multi-frame transmitted through the optical fiber cable 16 in first and second embodiments of the present invention. As shown in FIG. 6B, a subframe contains data of twenty four channels CH1 to CH24, a frame synchronization bit F, and a surplus bit B. As shown in FIG. 6A, sixteen subframes constitute a single multi-frame. Therefore, the single multi-frame shown in FIGS. 6A and 6B contains sixteen surplus bits that can be used for carrying a message or command for testing a subscriber.

FIGS. 7A and 7B show another example of the multi-frame. As shown in FIG. 7B, a subframe contains data of twenty-four channels CH1 to CH24 and an overhead bit F or B. As shown in FIG. 7A, the overhead bits contained in the first and ninth subframes are used as the frame synchronization bit F and the other overhead bits are surplus bits B in a single multi-frame. Therefore, the single multi-frame contains fourteen surplus bits that can be used for carrying a message or command for testing a subscriber.

FIGS. 8A to 8D are diagrams showing an example of commands communicated between the test control unit 62 of the RT 18 and the test/control section 64 of the FSN 10, according to a bit-oriented process. In this example, the maximum number of channels accommodated to a single FSN is sixteen, the maximum number of types of subscriber is eight, and the maximum number of test items is eight. The commands are constructed by sixteen overhead bits.

The test start command is shown in FIG. 8A. Each bit constituting the command corresponds to each channel. In the test start command, one of the sixteen bits has a value "1" and the other bits have values "0". Receiving the test start command, the test/control section 64 tests the subscriber corresponding to a bit having the value "1". The command indicating the test results is shown in FIG. 8C. Eight bits on the left side of the figure indicate a type of tested subscriber. For example, if the tested subscriber is for a POTS service, the eight bits are "1000 0000". The other eight bits indicate results with regard to the maximum eight test items. If the result is good, a corresponding bit becomes "0" and if the result is not good, a corresponding bit becomes "1". FIG. 8B shows a command issued from the RT 18 when the test has been finished and while a test is not requested.

Figure 9:
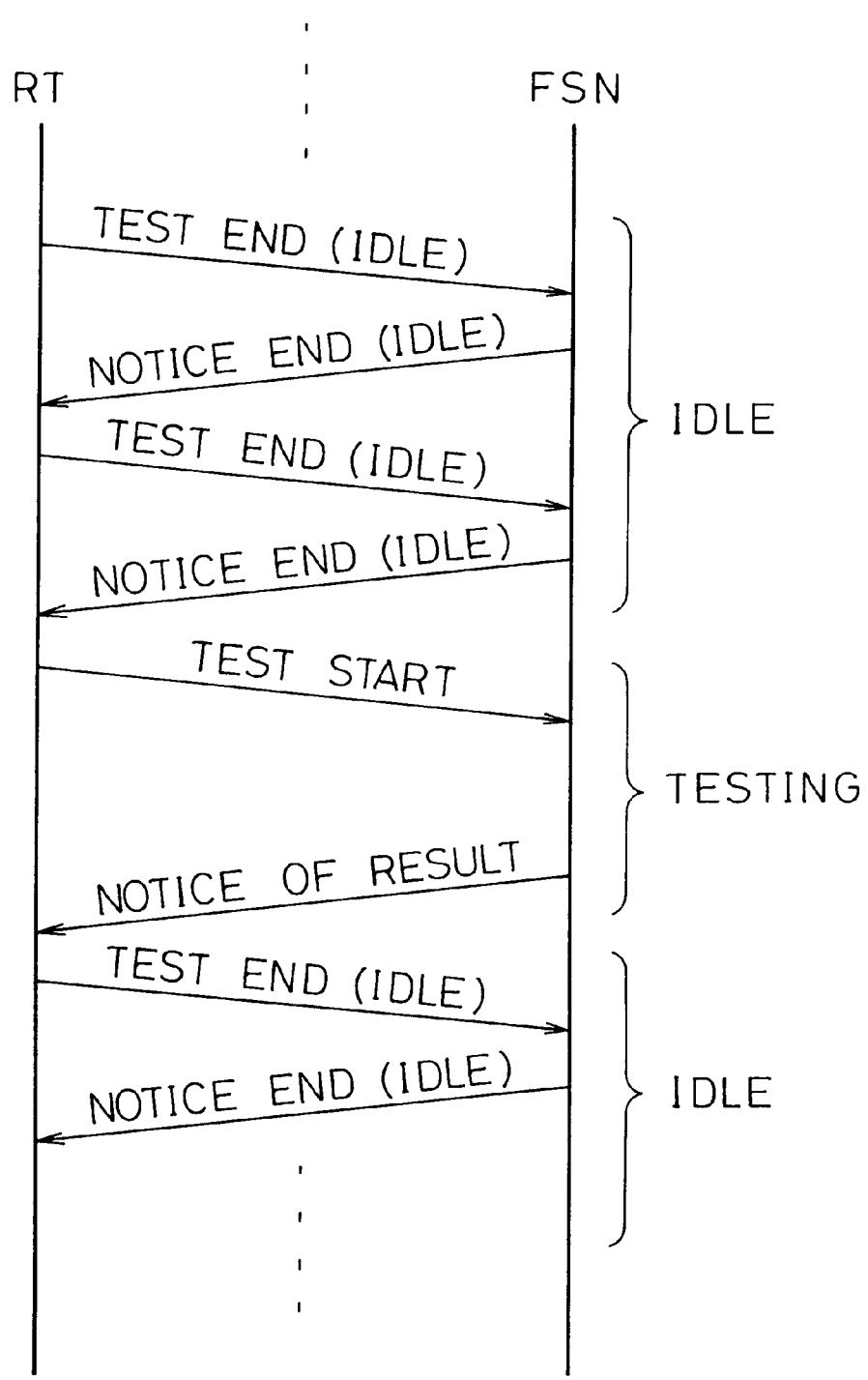
FIG. 9 is a diagram showing a communication sequence according to the present invention.

FIG. 8D shows a command issued from the FSN 10 when the notice is finished and while a test is not carried out. FIG. 9 shows a communication sequence between the RT 18 and the FSN 10.

In the second embodiment of the present invention, communication between the RT and the FSN is carried out using a number of overhead bits fewer than the bits for a single communication channel. The command designating a subscriber does not contain the type of subscriber. In addition, the test/control section of the FSN can be realized by simple hardware circuits because communication is carried out according to a bit-oriented process. Therefore, the FSN's can be installed within or near the houses of the subscribers at a low cost.

I claim:

1. A method of testing subscriber sets connected to a service node, said service node connected through a first bidirectional multiplex transmission line, which provides bidirectional communication channels for each of the subscriber sets, to a remote terminal, said remote terminal connected through a second bidirectional multiplex transmission line to a central office exchange, said method comprising the steps of:

sending a first command signal ordering a test of said subscriber sets, connected to the service node, through the central office exchange and the second bidirectional multiplex transmission line to the remote terminal;

sending a second command signal from the remote terminal through the first bidirectional multiplex transmission line to the service node in response to the first command signal, said second command signal derived from said first command signal;

testing and evaluating results of the test of the subscriber sets within the service node in response to the second command signal;

sending a first return signal including results of the evaluation of the subscriber sets from the service node through the first bidirectional multiplex transmission line to the remote terminal; and sending a second return signal from the remote terminal through the second bidirectional multiplex transmission line and central office exchange in response to the first return signal.

2. A method as claimed in claim 1, wherein the first bidirectional multiplex transmission line includes transmission of overhead bits in each of the bidirectional communication channels, and wherein the second command signal and the first return signal are transmitted on the overhead bits in the second command signal sending step and in the first return signal sending step.

3. A method as claimed in claim 2, wherein the second command signal includes a plurality of bits each bit corresponding to each of the subscriber sets connected to the service node, and the plurality of bits designate a subscriber sets to be tested.

4. A method as claimed in claim 2, wherein the first return signal includes a plurality of bits, each bit corresponding to one of a plurality of test items of the subscriber set to be tested and evaluated in the testing and evaluation step, and the plurality of bits indicate results of the evaluation.

5. A method as claimed in claim 4, wherein the service node comprises subscriber circuits for connecting subscriber sets having different subscriber types according to which of the test items are to be tested, and wherein a test of the subscriber set is carried out according to the subscriber types obtained from the subscriber circuits in the testing and evaluation step.

6. A remote terminal a) for connection to a service node connecting subscriber sets through a first bidirectional multiplex transmission line, which provides bidirectional communication channels for each of the subscriber sets, and b) for connection through a second bidirectional multiplex transmission line to a central office exchange, the remote terminal for testing and evaluation of the subscriber sets connected thereto, said remote terminal comprising:

a first multiplexer/demultiplexer means for separating a first command signal, from said central office exchange, ordering a test and an evaluation of said subscriber sets connected to the service node from the second bidirectional transmission line, and for incorporating a first return signal into the second bidirectional transmission line;

means for converting the first command signal which is message-oriented into a second command signal which is bit-oriented, and for converting a second return signal which is bit-oriented from said service node including results of the evaluation of said subscriber sets into the first return signal which is message-oriented; and a second multiplexer/demultiplexer means for incorporating the second command signal into the first bidirectional multiplex transmission line, and for separating the second return signal from the first bidirectional multiplex transmission line.

7. A remote terminal as claimed in claim 6, wherein the first bidirectional multiplex transmission line includes transmission of overhead bits in each of the bidirectional communication channels, and wherein the second multiplexer/demultiplexer means loads the second command signal on the overhead bits to incorporate the second command signal and unloads the second return signal from the overhead bits to separate the second return signal.

8. A remote terminal as claimed in claim 7, wherein the second command signal includes a plurality of bits, each bit corresponding to each of the subscriber sets connected to the service node, and the plurality of bits designate a subscriber set to be evaluated.

9. A remote terminal as claimed in claim 7, wherein the second return signal includes a plurality of bits, each bit corresponding to one of a plurality of test items of the subscriber set that is to be evaluated, and the plurality of bits indicate results of the evaluation.

10. A service node for connecting subscriber sets, and for connection through a first bidirectional multiplex transmission line, which provides bidirectional communication channels for each of the subscriber sets, to a remote terminal, said remote terminal connected through a second bidirectional transmission line to a central office exchange, the service node for testing and evaluation of the subscriber sets connected thereto, said service node comprising:

a multiplexer/demultiplexer means for separating a command to test and evaluate the subscriber sets connected to the service node from the first bidirectional multiplex transmission line, and for incorporating a return signal including results of the evaluation of said subscriber sets into the first bidirectional multiplex transmission line; and an evaluation means, connected to said multiplexer/demultiplexer means, for testing and evaluating the subscriber sets according to the command from the multiplexer/demultiplexer means, and for generating the return signal for the multiplexer/demultiplexer means wherein the command and the return signal are bit-oriented.

11. A service node as claimed in claim 10, wherein the first bidirectional multiplex transmission line includes transmission of overhead bits in each of the bidirectional communication channels, and wherein the multiplexer/demultiplexer means unloads the command from the overhead bits to separate the command and loads the return signal on the overhead bits to incorporate the return signal.

12. A service node as claimed in claim 11, wherein the command includes a plurality of bits, each bit corresponding to each of the subscriber sets connected to the service node, and the plurality of bits designate a subscriber set to be evaluated.

13. A service node as claimed in claim 11, wherein the return signal includes a plurality of bits, each bit corresponding to one of a plurality of test items of a subscriber set that is evaluated, and the plurality of bits indicate results of the evaluation.

14. A service node as claimed in claim 13, comprising subscriber circuits for accommodation of the subscriber sets having different subscriber types according to the test items to be tested, wherein the evaluation means evaluates the subscriber sets according to the subscriber types obtained from the subscriber circuits.

\* \* \* \* \*